United States Patent
Liang et al.

(10) Patent No.: US 7,128,773 B2
(45) Date of Patent: Oct. 31, 2006

(54) COMPOSITIONS HAVING ENHANCED WEAR RESISTANCE

(75) Inventors: Dah-Ben Liang, The Woodlands, TX (US); Greg Lockwood, Pearland, TX (US); Anthony Griffo, The Woodlands, TX (US)

(73) Assignee: Smith International, Inc., Houston, TX (US)

( * ) Notice: Subject to any disclaimer, the term of this patent is extended or adjusted under 35 U.S.C. 154(b) by 0 days.

(21) Appl. No.: 10/836,595

(22) Filed: Apr. 30, 2004

(65) Prior Publication Data

US 2005/0000317 A1    Jan. 6, 2005

Related U.S. Application Data

(60) Provisional application No. 60/467,347, filed on May 2, 2003.

(51) Int. Cl.
  *C22C 29/02*  (2006.01)
  *E21B 10/36*  (2006.01)

(52) U.S. Cl. ............... 75/236; 75/239; 75/240; 175/420.1; 175/420.2; 428/698

(58) Field of Classification Search .............. 75/236; 51/307
  See application file for complete search history.

(56) References Cited

U.S. PATENT DOCUMENTS

| | | | | |
|---|---|---|---|---|
| 5,039,311 A | * | 8/1991 | Bloecher | ................ 51/295 |
| 5,589,268 A | * | 12/1996 | Kelley et al. | ................ 428/408 |
| 5,663,512 A | * | 9/1997 | Schader et al. | ................ 75/239 |
| 5,791,422 A | * | 8/1998 | Liang et al. | ................ 175/374 |
| 5,944,127 A | * | 8/1999 | Liang et al. | ................ 175/374 |
| 6,659,206 B1 | * | 12/2003 | Liang et al. | ................ 175/374 |
| 6,682,580 B1 | * | 1/2004 | Findeisen et al. | ................ 75/236 |

FOREIGN PATENT DOCUMENTS

GB    2315777    11/1998

OTHER PUBLICATIONS

Xin Deng, et al. "Mechanical Properties of a Hybrid Cemented Carbide Composite"; International Journal of Refractory Metals & Hard Materials 19 (2001) 547-552 (6 pages).

UK- Combined Search and Examination Report dated Aug. 20, 2004 (6 pages).

* cited by examiner

*Primary Examiner*—Ngoclan T. Mai
(74) *Attorney, Agent, or Firm*—Osha Liang LLP

(57) ABSTRACT

A composite material includes a double cemented carbide and a coarse grain dopant, wherein the coarse grain is added in an amount sufficient to improve wear resistance of virgin double cemented carbide. The double cemented carbide may selected from the group of carbides consisting of W, Ti, Mo, Nb, V, Hf, Ta, and Cr carbides. The coarse grain dopant may also be at least one carbide selected from the group consisting of W, Ti, Mo, Nb, V, Hf, Ta, and Cr carbides. The coarse grain carbide may be between about 5% to about 90% by weight of the total carbide in the composite. Preferably, the coarse grain carbide is about 10% to about 50% by weight of the total carbide in the composite.

12 Claims, 3 Drawing Sheets

COMPOSITIONS HAVING ENHANCED WEAR RESISTANCE

CROSS-REFERENCE TO RELATED APPLICATIONS

This application, pursuant to 35 U.S.C. §119(e), claims priority to U.S. Provisional Application Ser. No. 60/467,347, filed on May 2, 2003. That application is incorporated by reference in its entirety.

STATEMENT REGARDING FEDERALLY SPONSORED RESEARCH OR DEVELOPMENT

Not applicable.

BACKGROUND OF INVENTION

1. Field of the Invention

The present invention relates to compositions having improved wear resistance characteristics.

2. Background Art

In drilling oil and gas wells or mineral mines, earth-boring drill bits are commonly used. Typically, an earth-boring drill bit is mounted on the lower end of a drill string and is rotated by rotating the drill string at the surface. With weight applied to the drill string, the rotating drill bit engages an earthen formation and proceeds to form a borehole along a predetermined path toward a target zone.

A rock bit, typically used in drilling oil and gas wells, generally includes one or more rotatable cones (also referred as to "roller cones") that perform their cutting function through the rolling and sliding movement of the cones acting against the formation. The cones roll and slide upon the bottom of the borehole as the bit is rotated, thereby engaging and disintegrating the formation material in its path. A borehole is formed as the gouging and scraping or crushing and chipping action of the rolling cones removes chips of formation material that are then carried upward and out of the borehole by circulation of a liquid drilling fluid or air through the borehole. Petroleum bits typically use a liquid drilling fluid which is pumped downwardly through the drill pipe and out of the bit. As the drilling fluid flows up out of the borehole, the chips and cuttings are carried along in a slurry. Mining bits typically do not employ a liquid drilling fluid; rather, air is used to remove chips and cuttings.

The earth-disintegrating action of the roller cone cutters is enhanced by a plurality of cutter elements. Cutter elements are generally inserts formed of a very hard material and are press-fit into undersized apertures or sockets in the cone surface. Due to their toughness and high wear resistance, inserts formed of tungsten carbide dispersed in a cobalt binder have been used successfully in rock-drilling and earth-cutting applications.

Breakage or wear of the tungsten carbide inserts limits the lifetime of a drill bit. The tungsten carbide inserts of a rock bit are subjected to high wear loads from contact with a borehole wall, as well as high stresses due to bending and impacting loads from contact with the borehole bottom. Also, the high wear load can cause thermal fatigue in the tungsten carbide inserts which can initiate surface cracks on the inserts. These cracks are further propagated by a mechanical fatigue mechanism caused by the cyclical bending stresses and/or impact loads applied to the inserts. This may result in chipping, breakage, and/or failure of inserts.

Inserts that cut the corner of a borehole bottom are subject to the greatest amount of thermal fatigue. Thermal fatigue is caused by heat generation on the insert from a heavy frictional loading produced as the insert engages the borehole wall and slides into the bottom-most crushing position. When the insert retracts from the borehole wall and the bottom of the borehole, it is quickly cooled by the circulating drilling fluid. This repetitive heating and cooling cycle can initiate cracking on the outer surface of the insert. These cracks are then propagated through the body of the insert when the crest of the insert contacts the borehole bottom, as high stresses are developed. The time required to progress from heat checking to chipping, and eventually, to breaking inserts depends upon formation type, rotation speed, and applied weight.

Thermal fatigue is more severe in mining bits because more weight is applied to the bit and the formation usually is harder, although the drilling speed is lower and air is used to remove cuttings and chips. In the case of petroleum bits, thermal fatigue also is of serious concern because the drilling speed is faster and liquid drilling fluids typically are used.

Cemented tungsten carbide (also known as sintered tungsten carbide) refers to a material formed by mixing particles of tungsten carbide, typically monotungsten carbide, and particles of cobalt or other iron group metal, and sintering the mixture. In a typical process for making cemented tungsten carbide, small tungsten carbide particles, e.g., 1–15 microns, and cobalt particles are vigorously mixed with a small amount of organic wax which serves as a temporary binder. An organic solvent may be used to promote uniform mixing. The mixture may be prepared for sintering by either of two techniques: it may be pressed into solid bodies, often referred to as green compacts; alternatively, it may be formed into granules or pellets, such as by pressing through a screen or tumbling, and then screened to obtain more or less uniform pellet sizes.

Such green compacts or pellets are then heated in a vacuum furnace to first evaporate the wax and then to a temperature near the melting point of cobalt (or the like) to cause the tungsten carbide particles to be bonded together by the metallic phase. After sintering, the compacts are crushed and screened for the desired particle size. Similarly, the sintered pellets, which tend to bond together during sintering, are crushed to break them apart. These are also screened to obtain a desired particle size. The crushed cemented carbide is generally more angular than the pellets, which tend to be rounded.

Another type of tungsten carbide is macro-crystalline carbide. This material is essentially stoichiometric WC. Most of the macro-crystalline tungsten carbide is in the form of single crystals, but some bicrystals of WC may also form in larger particles. Single crystal monotungsten carbide is commercially available from Kennametal, Inc., Fallon, Nev.

Carburized carbide is yet another type of tungsten carbide. Carburized tungsten carbide is a product of the solid-state diffusion of carbon into tungsten metal at high temperatures in a protective atmosphere. Sometimes it is referred to as fully carburized tungsten carbide. Such carburized tungsten carbide grains usually are multi-crystalline, i.e., they are composed of WC agglomerates. The agglomerates form grains that are larger than the individual WC crystals. These large grains make it possible for a metal infiltrant or a infiltration binder to infiltrate a powder of such large grains. On the other hand, fine grain powders, e.g., grains less than 5 µm, do not infiltrate satisfactorily. Typical carburized tungsten carbide contains a minimum of 99.8% by weight of WC, with a total carbon content in the range of about 6.08% to about 6.18% by weight.

In addition, U.S. Pat. No. 5,880,392, which is assigned to the assignee of the present application and is hereby incorporated by reference, discloses another type of carbide, which are known as double cemented carbides. Double cemented carbide composites disclosed in that patent comprise a plurality of first regions and a second ductile phase that separate the first regions from each other. Each first region comprises a composite of grains and a first ductile phase bonding the grains. The grains are selected from the group of carbides consisting of W, Ti, Mo, Nb, V, Hf, Ta, and Cr carbides. The first ductile phase is selected from the group consisting of Co, Ni, Fe, alloys thereof, and alloys with materials selected from the group consisting of C, B, Cr, Si and Mn.

A preferred first region comprises tungsten carbide grains that are cemented with a cobalt first ductile phase. The second ductile phase is selected from the group consisting of Co, Ni, Fe, W, Mo, Ti, Ta, V, Nb, alloys thereof, and alloys with materials selected from the group consisting of C, B, Cr, and Mn. A preferred second ductile phase is cobalt. Additionally, additives such as those selected from the group consisting of carbides, nitrides, and borides can be added to the second ductile phase to provide improved properties of wear resistance.

U.S. Pat. No. 5,880,382 discloses preparing double cemented carbides by combining hard phase particles (e.g., WC—Co), formed from the grains and first ductile phase, with the second ductile phase material under conditions of pressure and heat. The composite comprises in the range of from about 40 to 95 percent by volume first phase (the hard phase particles), and less than about 60 percent by volume second ductile phase based on the total volume of the composite, and more preferably the composite comprises in the range of from about 60 to 80 percent by volume first phase and in the range of from about 20 to 40 percent by volume second ductile phase based on the total volume of the composite. Composite embodiments comprising an additive in the second ductile phase comprise less than about 40 percent by volume of the additive based on the total volume of the second ductile phase.

Double cemented carbide composites have improved properties of fracture toughness when compared to conventional cemented tungsten carbide materials, without sacrificing wear resistance, i.e., having equal or better wear resistance than that of conventional cemented tungsten carbide materials, making the material well suited for such applications as roller cone bits, percussion or hammer bits, drag bits, and other applications such as mining and construction tools where properties of improved fracture toughness is desired.

However, in certain applications, double cemented carbides have been found to lack sufficient wear resistance. What is needed, therefore, are methods and compositions that increase the wear resistance, while maintaining fracture toughness.

SUMMARY OF INVENTION

In one aspect, the present invention relates to a composite material including a double cemented carbide and a coarse grain dopant, wherein the coarse grain dopant is added in an amount sufficient to improve wear resistance of virgin double cemented carbide.

In one aspect, the present invention relates to an insert formed from a composite material including a double cemented carbide and a coarse grain dopant, wherein the coarse grain dopant is added in an amount sufficient to improve wear resistance of virgin double cemented carbide.

Other aspects and advantages of the invention will be apparent from the following description and the appended claims.

DETAILED DESCRIPTION

Figure 1:
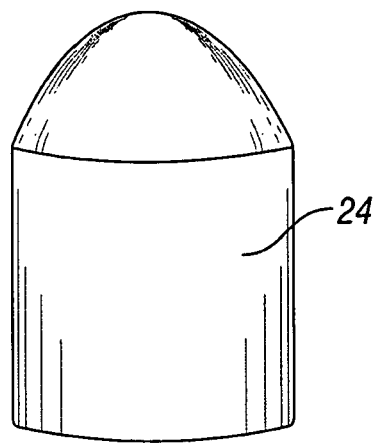
FIG. 1 shows an insert formed from a composite in accordance with an embodiment of the present invention.

The present invention relates to using an "effective amount" of a coarse grain additive ("coarse grain dopant") with double cemented carbides or other materials in order to improve the wear resistance of a composite material, while maintaining suitable fracture toughness. The coarse grain dopant may include coarse grain carbides produced from carburized processes (e.g., MAS 3000–5000 available from H.C. Starck), and macrocrystalline carbides (MCWC), available from Kennametal, for example. Effective amount, as used in this description, means the amount needed to improve at least one property of a composite material as compared to a base material.

Carbide particles are often measured in a range of mesh sizes, for example 40 to 80 mesh. The term "mesh" refers to the size of the wire mesh used to screen the carbide particles. For example, "40 mesh" indicates a wire mesh screen with forty holes per linear inch, where the holes are defined by the crisscrossing strands of wire in the mesh. The hole size is determined by the number of meshes per inch and the wire size. The mesh sizes referred to herein are standard U.S. mesh sizes. A standard 40 mesh screen has holes such that only particles having a dimension less than 420 μm can pass. That is, particles larger than 420 μm in size will be retained on a 40 mesh screen, while particles smaller than 420 μm will pass through the screen.

According to embodiments of the present invention, compositions for use in forming insert include carbides in the following forms: double cemented carbide and a coarse grain dopant. The coarse grain dopant preferably has a particle size in a range of about 30–50 micrometers (μm). In some embodiments, the double cemented carbide forms about 5% to about 90% by weight of the carbide phase, while the coarse grain dopant comprises from about 10% to about 95%, preferably from about 10% to about 50%, by weight of the carbide phase.

In one embodiment, compositions for use in forming insert in accordance with the present invention include carbides in the following forms: double cemented carbide and macro-crystalline tungsten carbide. In some embodiments, the double cemented carbide forms about 10% to about 90% by weight of the carbide phase, while the macro-crystalline carbide comprises from about 10% to about 90%, preferably from about 10% to about 50%, by weight of the carbide phase.

In general, suitable carbides for use in the present invention include those carbides selected from the group comprising W, Ti, Mo, Nb, V, Hf, Ta, and Cr carbides, and mixtures thereof. In preferred embodiments tungsten carbide, vanadium carbide, or mixtures thereof are used.

In some embodiments, conventionally carburized tungsten carbide is used. Conventionally carburized tungsten carbide is a product of the solid state diffusion of tungsten metal and carbon at a high temperature in a protective atmosphere. It is preferred to use conventionally carburized tungsten carbide with an impurity level of less than 0.1% by weight.

In other embodiments, tungsten carbide grains designated as WC MAS 2000 and 3000–5000 (available from H.C. Starck) are used. It is noted that similar products may be obtained from other manufacturers. These tungsten carbide grains contain a minimum of 99.8% WC and the total carbon content is at 6.13+/−0.05% with free carbon in the range of 0.04+/−0.02%. The total impurity level, including oxygen impurities, is less than about 0.16%.

Another reason that the MAS 2000 and 3000–5000 grades are preferred is that the particles are larger. Tungsten carbide in these grades is in the form of polycrystalline aggregates. The size of the aggregates is in the range of about 20–50 µm. After milling or powder processing, most of these aggregates break down to single-crystal tungsten carbide particles in the size range of about 7–9 µm. These large single-crystal tungsten carbide grains are suitable for use in embodiments of the invention.

Coarse or large tungsten carbide grains generally refer to those having nominal particle sizes exceeding 4 µm. It should be understood, however, that this is a preferred size and other sizes are acceptable so long as wear resistance is improved.

Composites of this invention can be prepared by a number of different methods, e.g., by rapid omnidirectional compaction (ROC) process, hot pressing, infiltration, solid state or liquid phase sintering, hot isostatic pressing (HIP), pneumatic isostatic forging, and combinations thereof. These processes are preferred because they can form the desired composite of this invention, which have improved properties of fracture toughness and wear resistance.

For example, carbide composites of this invention may be formed by mingling cemented hard phase particles with a ductile phase binder under conditions causing the cemented hard phase particles to be cemented by the ductile phase binder (to form double cemented carbides). Coarse grain carbides are then added to form composites in accordance with the present invention.

Double cemented carbides for use in this invention can be formed using different types of materials as the hard phase particles. Suitable materials for forming the hard phase particles are cermets that include hard grains formed from carbides or borides formed from refractory metals such as W, Ti, Mo, Nb, V, Hf, Ta, Cr, and a metallic cementing agent. Examplary hard grain materials include WC, TiC, TaC, $TiB_2$, or $Cr_2C_3$.

The metallic cementing agent may be selected from the group of ductile materials including one or a combination of Co, Ni, Fe, which may be alloyed with each other or with C, B, Cr, Si and Mn. Preferred cermets useful for forming the hard phase particles include cemented tungsten carbide with cobalt as the binder phase (WC—Co) and other cermets such as WC—Ni, WC—Fe, WC—(Co, Ni, Fe) and their alloys.

Hard phase particles useful for forming double carbide composites of this invention include conventional cermets, such as cemented tungsten carbide, having the following composition range: carbide component in the range of from about 75 to 97 percent by weight, and metallic cementing agent or binder in the range of from about 3 to 25 percent by weight.

The hard phase particles can also be formed from spherical cast carbide. Spherical cast carbide may be fabricated using the spinning disk rapid solidification process described in U.S. Pat. No. 4,723,996 and U.S. Pat. No. 5,089,182. Spherical cast carbide is a eutectic of WC and $W_2C$. If desired, the hard phase particles can be formed from mixtures of cemented tungsten carbide and spherical cast carbide, or combinations of other hard phase particles described above.

In an exemplary embodiment, the hard phase particles are formed from conventional cemented tungsten carbide, wherein each particle comprises a composite of tungsten carbide grains bonded by cobalt (WC—Co). The cemented tungsten carbide particles can be made by conventional mixing, pressing, and sintering to form a cemented tungsten carbide body. Such a body can then be crushed and screened to obtain a desired particle size for use in this invention. Alternatively, the particles can be made directly by forming agglomerates of tungsten carbide and cobalt of appropriate size which are then sintered to a desired size. This enables one to determine the shape as well as the size of the particles.

Hard phase particles used to form the double cemented carbide, which are made from cemented tungsten carbide are preferably in the form of substantially spherical particles. Such spherical particles can be made from pelletized mixtures of cobalt and tungsten carbide particles or by abrading crushed cemented tungsten carbide. The preferred substantially spherical cemented tungsten carbide pellets are bonded with cobalt.

The cemented tungsten carbide pellets (for use in forming the double cemented carbide) have a particle size that is preferably less than about 500 micrometers because while larger sized particles may exhibit better wear resistance, they are known to display a higher tendency for independent particles to microcrack or pull-out during abrasive wear situations.

In one embodiment, the cemented tungsten carbide pellets (used in forming the double cemented carbide) have a particle size in the range of from about 20 to 300 micrometers. Depending on the application, preferred particle sizes may be 45 to 75 micrometers and/or 75–300 micrometers.

The exact amount of the hard phase particles that are used will vary depending on the desired mechanical properties for a particular application.

The ductile binder phase of the double cemented carbide composites used along with the coarse grain carbides of this invention may be selected from the group of materials comprising one or more ductile metal, ductile metal alloy, refractory metals, additives, and mixtures thereof. Preferably, the ductile binder phase can be one, or a combination, of the following: W, Co, Ni, Fe, Mo, Ti, Ta, V, Nb. In addition, the ductile binder phase can be alloyed with C, B, Cr and Mn.

Co is a preferred ductile binder phase material when the hard phase particles are formed from cemented tungsten carbide (WC—Co) because it has better thermodynamic compatibility, wetting, and interfacial bonding with WC grains, as compared to nickel or iron.

Further description of double cemented carbides is omitted for the sake of clarity. U.S. Pat. No. 5,880,382 describes the preparation of suitable double cemented carbides for use in the present invention, and is incorporated by reference herein.

In an exemplary embodiment, spherical WC—6Co (6% cobalt) sintered pellets having an average particle size of approximately 40 to 50 micrometers were wet milled together with A1000C low-carbon ductile steel powder in heptane fluid, and approximately two percent by weight paraffin wax was added thereto. Approximately 36 percent by volume (i.e., less than 25 percent by weight) of the ductile steel was used.

Additionally, an appropriate amount of coarse carbide is added to the mixture. After milling, the powder was dried and it was pressed into green compacts on a uniaxial press to a specific dimension. The green compacts was then presintered in a vacuum at approximately 950° C. for 30 minutes. The pre-sintered compact was then subject to a rapid omnidirectional compaction process at approximately 1,100° C. with 120 ksi pressure. Other ductile metal alloy binders may also be used to fabricate samples using the ROC process. The samples were then evaluated for microstructure and mechanical properties.

In one embodiment, the double cemented carbide was prepared in a manner similar to that described above, except that the ductile binder phase material was cobalt and included an additive of WC particles. The additive was in the form of WC, having an average particle size in the range of from about 10 to 15 micrometers. Specifically, the composite comprised approximately 38 percent by weight ductile binder phase material and additive, based on the total weight of the composite, and approximately 10 percent by weight WC additive, based on the total weight of the ductile binder phase material and the additive. The spherical pellets of cemented tungsten carbide had an average particle size in the range of from about 150 to 200 micrometers.

In one embodiment, the coarse carbide dopant was added as 5 μm tungsten carbide, in an amount sufficient to constitute 4% by weight of the carbide phase. This resulted in an increase in the wear resistance of an insert formed in this manner of 13%.

In another embodiment, 15 μm vanadium carbide was added in an amount sufficient to constitute 14% by weight of the carbide phase. This resulted in an increase in the wear resistance of 23%.

The above two examples show that larger particle size and/or more coarse grain dopants produce better wear resistance. One of ordinary skill in the art would appreciate that it would be possible to select a proper grain size and percentage of the coarse grain dopant to achieve a desired improvement in wear resistance.

Other embodiments were tested, and the results are shown in the below tables. MCWC is an abbreviation for macrocrystalline tungsten carbide.

| Using −200 + 325 mesh sintered cemented carbide pellets (smaller) | | | | |
| --- | --- | --- | --- | --- |
| Amount of MCWC addition (volume %) | High Stress Wear Resistance | % Improvement | Bending Strength | % Improvement |
|  | 1.00 |  | 1.00 |  |
| 5% | 1.46 | 46% | 1.07 | 7% |
| 10% | 1.41 | 41% | 1.09 | 9% |

| Using −50 + 200 mesh sintered cemented carbide pellets (larger) | | | | | | | | |
| --- | --- | --- | --- | --- | --- | --- | --- | --- |
| Amount of MCWC addition (volume %) | Dry Sand Abrasion Resistance (lower is better) | % Improvement | High Stress Wear Resistance | % Improvement | Bending Strength | % Improvement | Matrix Hardness | % Improvement |
|  | 1.00 |  | 1.00 |  | 1.00 |  | 1.00 |  |
| 20% | 0.84 | 16% | 1.28 | 28% | 1.10 | 10% | 1.35 | 35% |
| 25% | 0.78 | 22% | 1.31 | 31% | 1.20 | 20% | 1.56 | 56% |

As can be seen from the above examples, both the double cemented carbide phase and the coarse grain dopant may be selected from a number of compounds, such as those disclosed above. The ultimate selection of composition type and amount may vary depending on the formation to be drilled. In embodiments of the present invention, macrocrystalline carbide additives may form about 1% to about 50% of the total carbide in the composite. In preferred embodiments, the macrocrystalline carbide may comprise between about 5% and 25%.

In preferred embodiments, when using coarse grain carbide ("coarse grain dopant") formed from a carburized process (as described above with reference to MAS 3000–5000), an average size ratio between the coarse grain dopant and the double cemented carbide pellet will be from 1/1 to 1/10 in diameter. That is, the coarse grain dopant will range from approximately the same size to one tenths the size of the double cemented carbide pellet.

In preferred embodiments using macrocrystalline carbides, the average size ratio between the coarse grain dopant and the double cemented carbide pellet will be from 1/1 to 1/100 in diameter. That is, the coarse grain dopant will range from approximately the same size to one hundredth the size of the double cemented carbide pellet.

Further, in preferred embodiments, regardless of the nature of the coarse grain dopant, the composite material (double cemented carbide+dopants or additives) will have the dopant present in an amount between about 5% to 90% by weight of the total carbide in the composite material. More preferably, the dopant will be between about 5% to 50% of the weight of the total carbide in the composite.

Composites of this invention can be used in a number of different applications, such as tools for mining and construction applications, where mechanical properties of high fracture toughness, wear resistance, and hardness are highly desired. Composites of this invention can be used to form wear and cutting components in such tools as roller cone bits, percussion or hammer bits, drag bits, and a number of different cutting and machine tools.

Figure 2:
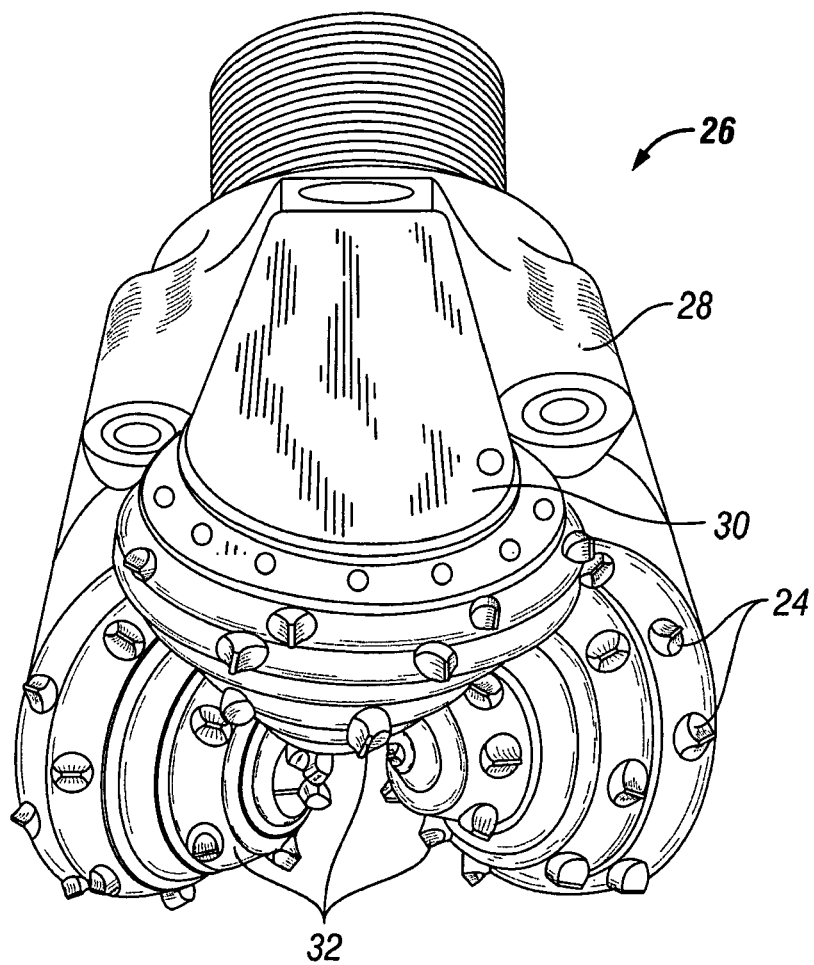
FIG. 2 shows a roller cone drill bit having inserts formed from a composite in accordance with an embodiment of the present invention included therein.

For example, referring to FIG. 1, composites of this invention can be used to form a mining or drill bit insert 24. Referring to FIG. 2, such an insert 24 can be used with a roller cone drill bit 26 comprising a body 28 having three legs 30, and a cutter cone 32 mounted on a lower end of each leg. Each roller cone bit insert 24 can be fabricated according to one of the methods described above. The inserts 24 are provided in the surfaces of the cutter cone 32 for bearing on a rock formation being drilled.

Figure 3:
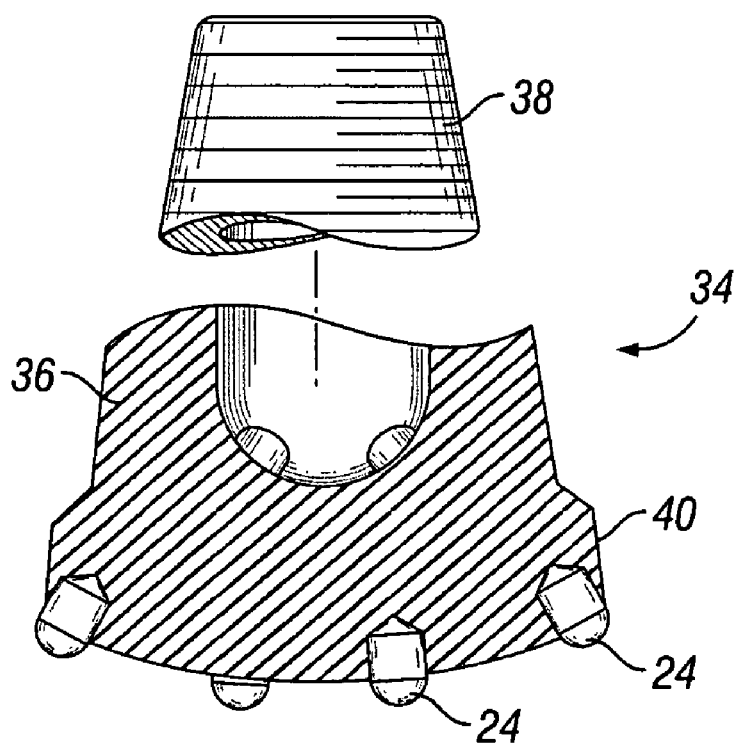
FIG. 3 shows a hammer or percussion bit having inserts formed from a composite in accordance with an embodiment of the present invention included therein.

Referring to FIG. 3, inserts 24 formed from composites of this invention can also be used with a percussion or hammer bit 34, comprising a hollow steel body 36 having a threaded pin 38 on an end of the body for assembling the bit onto a drill string (not shown) for drilling oil wells and the like. A plurality of the inserts 24 are provided in the surface of a head 40 of the body 36 for bearing on the subterranean formation being drilled.

Figure 4:
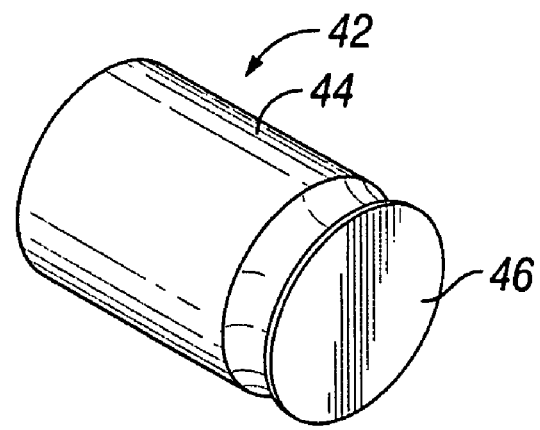
FIG. 4 shows shear cutters formed from a composite in accordance with an embodiment of the present invention.
Figure 5:
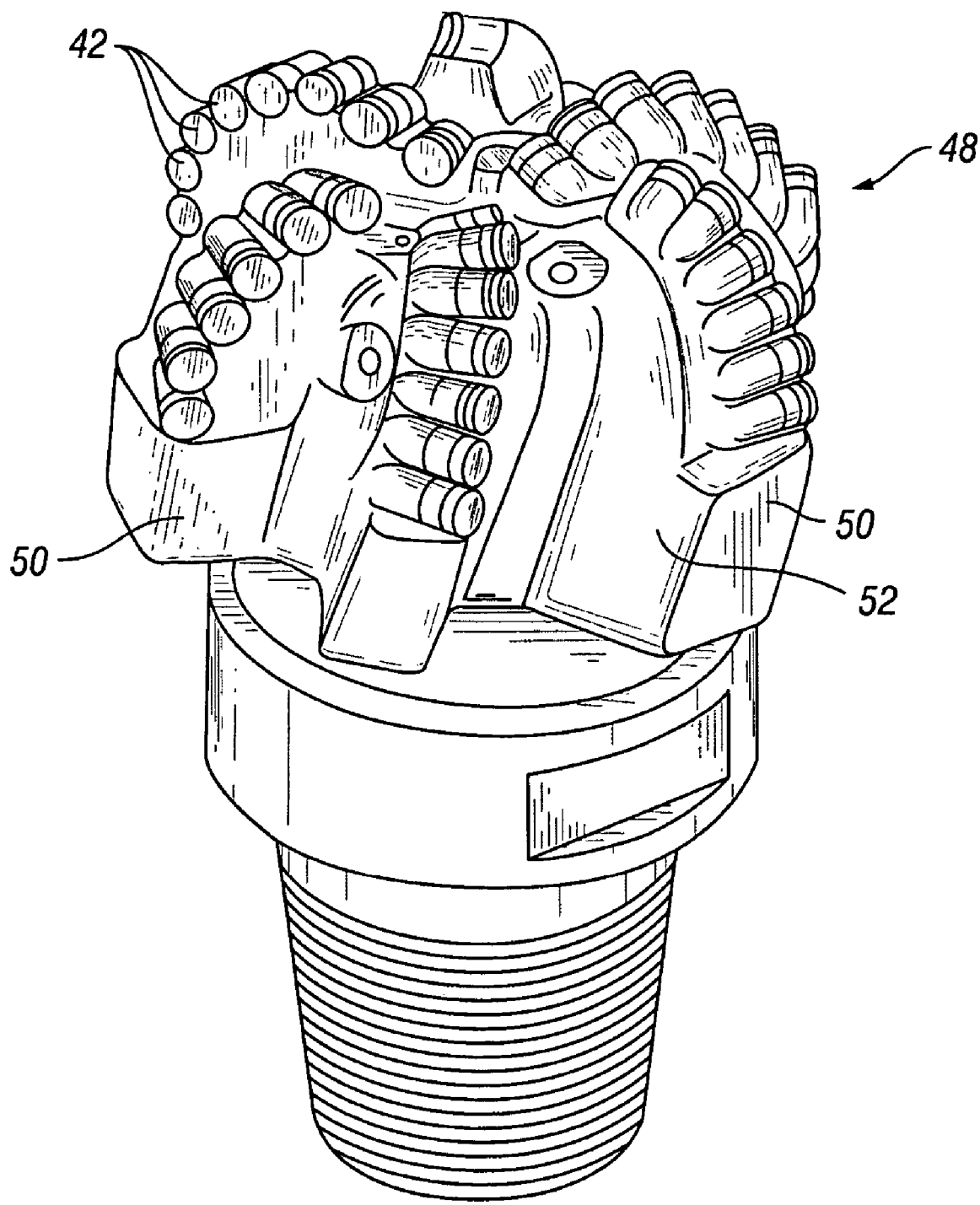
FIG. 5 shows a drag bit having shear cutters formed from a composite in accordance with an embodiment of the present invention included thereon.

Referring to FIG. 4, composites of this invention can also be used to form PCD shear cutters 42 that are used, for example, with a drag bit for drilling subterranean formations. More specifically, composites of this invention can be used to form a shear cutter substrate 44 that is used to carry a layer of polycrystalline diamond (PCD) 46 that is sintered thereto. Referring to FIG. 5, a drag bit 48 comprises a plurality of such PCD shear cutters 42 that are each attached to blades 50 that extend from a head 52 of the drag bit for cutting against the subterranean formation being drilled.

Advantageously, embodiments of the present invention provide composite materials that may be used in a number of drilling applications, which have both good rock toughness and wear resistance properties. Embodiments of the invention are found to have better wear resistance as compared to "virgin" double cemented carbides. While the precise mechanism for the improved properties is not known, it is believed that the coarser sintered carbide pellets contribute to the increased wear resistance. One hypothesis for the improvement is increasing the wear resistance and strength of the metallic pools. It is believed that the addition of coarse grain carbide or macrocrystalline carbide particles adds to the wear resistance of double cemented carbide due to the high wear resistance of these carbides.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A composite material comprising:
    a double cemented carbide; and
    a coarse grain dopant, wherein the coarse grain dopant is added in an amount sufficient to improve wear resistance of the double cemented carbide, and wherein an average grain size of the coarse grain dopant is about 30–50 micrometers.

2. The composite material of claim 1, wherein the double cemented carbide is selected from the group of carbides consisting of W, Ti, Mo, Nb, V, Hf, Ta, and Cr carbides.

3. The composite material of claim 1, wherein the coarse grain dopant comprises at least one carbide selected from the group consisting of W, Ti, Mo, Nb, V, Hf, Ta, and Cr carbides.

4. The composite material of claim 1, wherein the coarse grain dopant comprises between about 5% and about 90% by weight of the total carbide in the composite.

5. The composite material of claim 4, wherein the coarse grain dopant comprises about 10% to about 50% by weight of the total carbide in the composite.

6. The composite material of claim 1, wherein an average size ratio between a diameter of the coarse grain dopant and the double cemented carbide pellet is from 1/1 to 1/10.

7. A composite material comprising:
    a double cemented carbide;
    macrocrystalline carbide; and
    a coarse grain dopant, wherein the coarse grain dopant is added in an amount sufficient to improve wear resistance of the double cemented carbide, and wherein an average grain size of the coarse grain dopant is about 30–50 micrometers.

8. The composite material of claim 7, wherein the average size ratio of a diameter between the coarse grain dopant and the double cemented carbide pellet is from 1/1 to 1/100.

9. The composite material of claim 7, wherein the macrocrystalline carbide is present in an amount from about 1% to 50% by weight of the total carbide in the composite.

10. An insert for use in a drill bit formed from the composite material of claim 1.

11. An insert for use in a drill bit formed from the composite material of claim 7.

12. An insert for a PDC bit comprising
    a layer of polycrystalline diamond disposed on a substrate, wherein the substrate comprises a double cemented carbide and a coarse grain dopant, wherein the coarse grain dopant is added in an amount sufficient to improve wear resistance of the double cemented carbide, and wherein an average grain size of the coarse grain dopant is about 30–50 micrometers.

* * * * *